United States Patent Office 3,443,975
Patented May 13, 1969

3,443,975
VINYL ACETATE GRINDING AID
Frank G. Serafin, Peabody, Mass., assignor to W. R. Grace & Co., Cambridge, Mass., a corporation of Connecticut
No Drawing. Filed Aug. 23, 1965, Ser. No. 481,900
Int. Cl. C04b 7/54, 7/02
U.S. Cl. 106—90          10 Claims

ABSTRACT OF THE DISCLOSURE

A composition containing a solid material and, intimately admixed therewith, vinyl acetate. The vinyl acetate effects a more efficient grinding of the solid material when such is ground in a mill. Further, the ground composition is enhanced with respect to resistance to pack set. The solid material can be a naturally occurring inorganic mineral, a partially processed mineral, cement clinker or ceramic. When the solid material is, for instance, portland cement, concrete prepared from the resulting interground composition exhibits increased compressive strength.

---

This invention relates to grinding minerals and more particularly to the use of an additive for improving the grinding efficiency and pack set characteristics of minerals.

In the processing of minerals, either in the unprocessed or semiprocessed state, a grinding operation is generally necessary to reduce the particular mineral to a relatively small particle size. It is desirable in this grinding step to have as efficient an operation as possible, that is, to reduce the particular mineral to the desired particle size at a relatively rapid rate.

Cleavage of the particles during grinding of the minerals exposes fresh or nascent surfaces which have high energies due probably to the breaking of ionic bonds. The surface forces of the ground particles persist for some time after grinding and lead to compaction or pack set and/or poor fluidity if they are not reduced. Mineral particles when compacted by vibration, e.g., when transported in a hopper car, often become semi-rigid and will not flow until considerable mechanical effort has been applied to break up the compaction. On the other hand, undue reduction or the complete absence of surface forces is undesirable because the finely ground mineral becomes excesively fluid.

A grinding aid is a material which assists in grinding of minerals, either by increasing the rate of production or by increasing the fineness of the particles at the same rate of production without having adverse effects on any of the properties of the ground product.

The term "pack set" as used herein is intended to refer to the agglomeration or adhesion of particles by, e.g., storing or transporting in bulk. Adhesion results from surface forces, the majority of which are created during the grinding of the minerals. "Pack set index" is a relative term which numerically indicates how prone a particular material is to start flowing after it is stored or transported in bulk. "Pack set index ratio" is the relative pack set index of the untreated sample compared to the treated sample. This ratio is used to permit comparison between different samples of the mineral.

Pack set index is determined in the following manner: 100 grams of the mineral is placed in a 250 milliliter Erhlenmeyer flask set on top of a variable vibrator. The flask containing a mineral is vibrated 15 seconds after which time it is removed from the vibrator and fed into a jig with the axis of the flask lying horizontally. The flask is then rotated about its axis until the mineral which is compacted on the bottom of the flask collapses. The flask is twisted by turning at 180° angles at approximately 100 twists per minute. The number of 180° twists required for the mineral sample to collapse establishes the pack set index. Thus, the greater the energy requirement to break up the bed, the higher will be the pack set index.

A novel additive has now been found which will function as a grinding aid and a pack set inhibitor for minerals. The novel additive of the present invention is vinyl acetate.

The additive is interground with the mineral in the grinding mill to provide increased grinding efficiency as well as other advantageous results, e.g., inhibiting pack set of bulk stored materials. It has also been found that the novel additive of the present invention also serves to provide fluidity to the ground minerals when they are being transported by conveying systems, particularly by pneumatic air systems.

The term "mineral" as used herein is intended to refer to naturally occurring inorganic minerals, such as phosphate rock, partially processed minerals such as concentrated iron ore, and mixtures of minerals such as cement clinker or ceramics. As examples of such minerals which can be processed with the additive of the present invention, mention may be made of beryllium oxide, limestone, gypsum, clays, and bauxite.

The grinding aides of the present invention are particularly preferred for use with cement, particularly portland cement.

Portland cement represents a class of hydraulic cements and is comprised essentially of two calcium silicates and a lesser amount of calcium aluminate. These cements are produced by heating an intimate mixture of finely divided calcareous material (limestone) and argillaceous material (clay) to fusion to form a clinker. The clinker is ground with the addition of about 2% gypsum, or some other form of calcium sulfate, to obtain the desired setting qualities in the finished cement. It is to the clinker that the novel additive of this invention is preferably added to increase grinding efficiency and to inhibit subsequent pack set in the finished cement.

The additive of the present invention is preferably employed undiluted in liquid form. The addition is accomplished either prior to the grinding or the additive is introduced into the grinding mill simultaneously with the mineral if the additive is employed merely for reduction of pack set and fluidizing purposes, it is added at any convenient point in the processing.

The additive of the present invention is employed preferably as the sole grinding aid, but it should be understood that it can also be employed with a mixture of one or more grinding aids or in admixture with cement additives other than grinding aids.

The additive is employed effectively over a relatively wide range. The preferred range is about 0.001 to 1%, and more preferably about 0.005 to about 0.05% based on the weight of the mineral, i.e., weight of additive solids based on weight of mineral solids (herein referred to as solids on solids). In a particularly preferred embodiment about 0.04% of the additive based on the weight of the mineral is employed. The higher levels are employed if grinding to a relatively high surface area, and the amount of additive used is limited only by the desired surface area and fluidity of the finished product.

In Table 1 the effectiveness of vinyl acetate as a grinding aid is reported along with data on pack set characteristics. The data was collected on a Type I portland cement ground in a laboratory steel ball mill for 4400 revolutions at 210° F.

TABLE 1

| Amount of additive (percent solid on solid) | Blaine surface area, cm.²/g. | Pack set index |
|---|---|---|
| 0 | 2,890 | 35.5 |
| 0.04 | 3,420 | 0.9 |

The test results in Table 1 show that vinyl acetate provides a substantial increase in the grinding efficiency of cement clinker and, at the same time, provides a substantial improvement in the flowability of the ground cement, as indicated by the Pack Set Index.

In Table 2 the ASTM compressive strength data is shown of mortars prepared from cements which were interground with vinyl acetate. The water/cement ratio was 0.46. The cements were ground for 4400 mill revolutions at 210° F.

TABLE 2

| Amount of additive (percent solid on solid) | Compressive strength, p.s.i. | | |
|---|---|---|---|
| | 1-day | 7-day | 28-day |
| 0 | 817.5 | 2512.5 | 4125 |
| 0.04 | 1022.5 | 3325 | 4975 |

Table 2 shows that the compressive strengths of cements containing the vinyl acetate are significantly higher at the 1-, 7-, and 28-day testing periods.

While the additive of the present invention is described primarily in terms of grinding cement clinker, satisfactory results are obtained when the additive is utilized in grinding other materials.

What is claimed is:

1. A composition consisting essentially of a solid material selected from the group consisting of naturally occurring inorganic minerals, partially processed minerals, cement clinker and ceramic, and, intimately admixed therewith, vinyl acetate, the amount of said vinyl acetate employed being sufficient to increase grinding efficiency, when said composition is ground in a grinding mill.

2. A composition as defined in claim 1 wherein said vinyl acetate is used at a level of about 0.001 to 1% by weight based on the weight of said solid material.

3. A composition as defined in claim 1 wherein said vinyl acetate is present at a level of about 0.04% based on the weight of said solid material.

4. A composition as defined in claim 1 wherein said solid material is a hydraulic cement clinker.

5. The method which comprises intergrinding a solid material selected from the group consisting of naturally occurring inorganic minerals, partially processed minerals, cement clinker and ceramics with vinyl acetate, the amount of said vinyl acetate employed being sufficient to increase grinding efficiency.

6. The method as defined in claim 5 wherein said vinyl acetate is added to the solid material prior to introducing the solid material into the grinding zone.

7. The method as defined in claim 5 wherein said vinyl acetate is present at a level of about 0.001 to 1% by weight based on the weight of said solid material.

8. The method as defined in claim 5 wherein said solid material is portland cement.

9. A composition consisting essentially of portland cement and, intimately admixed therewith 0.001 to 1% by weight, based on the weight of said portland cement, of vinyl acetate.

10. The method which comprises intergrinding portland cement with 0.001 to 1% by weight, based on the weight of said portland cement, of vinyl acetate.

References Cited

UNITED STATES PATENTS

| 3,093,499 | 6/1963 | Blackwood et al. | 106—90 |
| 3,183,105 | 5/1965 | Serafin et al. | 106—90 |

JAMES E. POER, *Primary Examiner.*

U.S. Cl. X.R.

106—39, 102, 314